United States Patent [19]
Duecker

[11] Patent Number: 5,951,238
[45] Date of Patent: Sep. 14, 1999

[54] AUTO PALLET STACKING/LOADING DEVICE

[76] Inventor: Peter Duecker, Ernst-Tellering-Strasse 13, Langenfeld, Germany, 40764

[21] Appl. No.: 08/906,715

[22] Filed: Aug. 5, 1997

[51] Int. Cl.[6] .................................................. B65G 57/00
[52] U.S. Cl. ................................... 414/794.9; 414/795.3; 414/802; 414/795.2
[58] Field of Search ............................. 414/794.9, 795.3, 414/789, 789.1, 799, 789.9, 801, 802, 795.2

[56] References Cited

U.S. PATENT DOCUMENTS

| | | | |
|---|---|---|---|
| 2,602,554 | 7/1952 | Griffith | 414/789.1 |
| 3,010,588 | 11/1961 | McBean . | |
| 3,037,645 | 6/1962 | Simpkins . | |
| 3,038,615 | 6/1962 | Roth et al. . | |
| 3,074,595 | 1/1963 | Boller . | |
| 3,231,101 | 1/1966 | Cooper . | |
| 3,502,231 | 3/1970 | Raynor et al. . | |
| 3,765,546 | 10/1973 | Westerling . | |
| 3,884,366 | 5/1975 | Leenaards . | |
| 3,904,045 | 9/1975 | Thibault . | |
| 4,055,245 | 10/1977 | Sundberg | 414/789.9 |
| 4,212,579 | 7/1980 | Stromberg . | |
| 4,221,519 | 9/1980 | Nord et al. . | |
| 4,273,490 | 6/1981 | James | 414/795.2 |
| 4,498,381 | 2/1985 | Convey, Jr. | 414/795.3 |
| 4,508,483 | 4/1985 | Hessling et al. . | |
| 4,743,154 | 5/1988 | James et al. . | |
| 4,753,564 | 6/1988 | Pearce et al. . | |
| 4,764,074 | 8/1988 | Postigo . | |
| 4,778,323 | 10/1988 | Salts | 414/795.3 |
| 4,865,515 | 9/1989 | Dorner et al. | 414/795.2 |
| 4,958,983 | 9/1990 | Fisch . | |
| 5,020,966 | 6/1991 | Kiker | 414/795.2 |
| 5,051,058 | 9/1991 | Roth | 414/789.1 |
| 5,118,243 | 6/1992 | Huebner et al. . | |

*Primary Examiner*—Janice L. Krizek
*Assistant Examiner*—Gregory A Morse
*Attorney, Agent, or Firm*—Philip Summa, Patent Attorney

[57] ABSTRACT

The invention is a method and apparatus for forming a plurality of stackable items into a vertically stacked load and thereafter delivering an aligned stack of items positioned on a pallet for eventual transportation while minimizing the misalignment of the stackable items. The apparatus comprises a conveyor for delivering items to be stacked, a vertically moveable conveyor portion, a horizontally reciprocating platform for securing the lifted item, and a retaining front wall and two side walls for aligning the stacked items. The method comprises lifting an item to a position above a stacking position, securing the item in its lifted position, delivering a succeeding item into a position beneath the lifted item, lifting the succeeding item to a position immediately beneath the lifted item, releasing the secured item to drop onto the succeeding item, lifting the item and succeeding item together, and repeating the steps until reaching a desired stacking height.

35 Claims, 8 Drawing Sheets

LIFT TABLE IN LOWEST POSITION

AUTO PALLET STACKING/LOADING DEVICE

FIELD OF THE INVENTION

The invention relates to methods and apparatus for stacking succeeding delivered items and thereafter delivering the stack of items. In particular, the invention relates to an apparatus and method for forming a plurality of stackable items into a vertically stacked load.

BACKGROUND OF THE INVENTION

Historically items were palletized or stacked manually by individuals who would stack items one on top of the other in a vertical fashion. This method was restricted however to a human's lifting range. Consequently, in some more recent stacking systems, the pallet and items to be stacked have been placed on a platform which descends into a "pit" as the items are stacked, while attempting to keep the top of the stack within the normal lifting range of a person. Although the pit loading method is not limited to a person's lifting range, it requires a scissor lift or the like to secure the top of the stack at the operator's level and to raise the stacked items from the pit for eventual transportation.

Another method for stacking items is to clamp or "squeeze" an item on opposite sides by lateral retention plates or pinch-bars. This type of gripping method uses powerful pinch-bars to lift an item to a predetermined height, thus allowing for the introduction of a succeeding item beneath the lifted item. After the succeeding item is positioned beneath the lifted item, the pinch-bars are lowered and released, thereby depositing the lifted item onto the succeeding item. Next, the pinch-bars descend and clamp the lower of the two stacked items. This process of clamping, lifting and stacking is repeated to form a pallet of stacked loads. This type of lifting method, however, is dependent upon significant lateral forces which may tend to bend or damage non-rigid items to be stacked. The bending creates an uneven surface on the clamped item which leads to the tilting of the stacked items.

Another conventional method in the stacking industry uses lifting forks to vertically raise successive items to be stacked thereafter. While the forks secure the first item at a predetermined stacking height, succeeding items are introduced beneath. Next, the forks are lowered and disengaged, thereby depositing the lifted item upon the succeeding item. This method has been adapted to include a pair of reciprocating lift forks which operate in an alternating fashion to lift and stack succeeding items. However, this fork-lifting cycle includes a substantial amount of dead time to include withdrawal, downward movement, approach and upward movement of the forks. Moreover, the alternating fork method requires constant monitoring to avoid a slight deviation in the timing sequence which may prevent effective stacking.

Yet another method for stacking items includes opposing support fingers engaged beneath a stacking position and guided along vertical rails. The finger supports project into an area beneath an item to be stacked. As the finger supports ascend vertically along the guide rails, a first item is lifted to a predetermined height. Thereafter, a succeeding item is introduced into the stacking position, the vertical rails are lowered and the top item is deposited upon the succeeding item as the finger supports are lowered. Downward movement of the finger supports causes the fingers to pivot in an upward direction and disengage from beneath the first item upon contact with the succeeding item. This method, however, tends to damage the surfaces of the stacked items when the fingers are sandwiched therebetween during their descent. Moreover, this finger support method fails to align the stacked items in a fashion suitable for eventual transport. Furthermore, the finger support lifting apparatus is typically limited to a carriage or item of predetermined dimensions.

OBJECT AND SUMMARY OF THE INVENTION

Therefore, it is an object of the present invention to provide a method for forming a plurality of stackable items into a vertically stacked load that simultaneously loads and aligns stacked items in a vertical fashion. Accordingly, the invention comprises a stacking apparatus for stacking succeeding delivered items and thereafter delivering an aligned stack of the items for eventual transport.

The apparatus comprises a conveyor system for delivering items to be stacked, a means for raising liftable portions of the conveyor and an item thereon, and a means for securing the lifted item at an elevated position. The raising means comprises liftable portions of the conveyor with defined lifted and lowered positions. The means for securing a lifted item or items at an elevated position comprises a plurality of reciprocating arms which engage beneath the lifted item or items and thereby support the lifted item at the elevated position.

The conveyor system comprises an advancing means for advancing items to be stacked to the liftable portions of the conveyor and a positioning means for aligning stacked items located above the liftable conveyor portion. The positioning means is comprised of laterally reciprocating side walls which are engaged against at least three sides of the stacked items in an elevated position. The positioning means includes a preventing means comprised of hinge-mounted gates for preventing items to be stacked from advancing past the liftable conveyor portions.

A method for forming a plurality of stackable items into a vertically stacked load includes lifting a portion of a conveyor and a first item positioned thereon and stacking the first item on succeeding items delivered to the liftable conveyor portions at a stacking position. When the liftable conveyor portion raises a first item, support means engage beneath the first item to thereby support the lifted item at an elevated position. Next, the liftable portion of the conveyor is lowered while multiple side walls are engaged, thereby pressing against at least three sides of the secured lifted item at an elevated position and aligning the items firmly in position. The reciprocating side walls are capable of handling items of varied dimensions.

When a succeeding item to be stacked is fed into the stacking position, the liftable conveyor portion vertically lift the item to a position immediately beneath the secured lifted first item. After a succeeding item is positioned beneath the top item, the support means securing the upper item is retracted, the top items drop onto the succeeding item, the side walls are slackened and the complete stack is lifted again to an elevated position where the stacked items are temporarily secured by the support means. Next, the side walls are engaged once again thereby aligning the stacked items. These steps are repeated until the items reach a predetermined stacking height.

Upon reaching the desired stacking height, the liftable conveyor portion is lowered to a lower level roller containing an empty stacking pallet, the empty pallet is moved onto the liftable conveyor portion beneath the entire stacked load, the support means is retracted, and the entire stacked load drops onto the empty pallet. Once the preventing means is opened, the palletized stack can be discharged, ready for loading onto ground transportation.

Because the positioning means and preventing means are positioned adjacent to the liftable conveyor portions, the system simultaneously stacks and aligns the stacked load, thereby reducing the time associated with conventional methods requiring separate aligning and stacking steps.

The foregoing and other advantages and features of the invention and the manner in which the same are accomplished will become more readily apparent upon consideration of the following detailed description of the invention taken into conjunction with the accompanying drawings, which illustrate preferred an exemplary embodiments, and wherein:

BRIEF DESCRIPTION OF THE DRAWINGS

FIG. 5 shows the side walls reciprocated against the sides of the stacked items, the platform engaged thereunder, and the liftable portion of the conveyor in a partially raised position.

FIG. 6 shows the platform retracting from beneath the secured lifted items.

FIG. 7 shows the platform fully retracted and the side walls partially retracted, thereby allowing the raised stack of items to partially drop onto the liftable conveyor portion and the items thereon.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
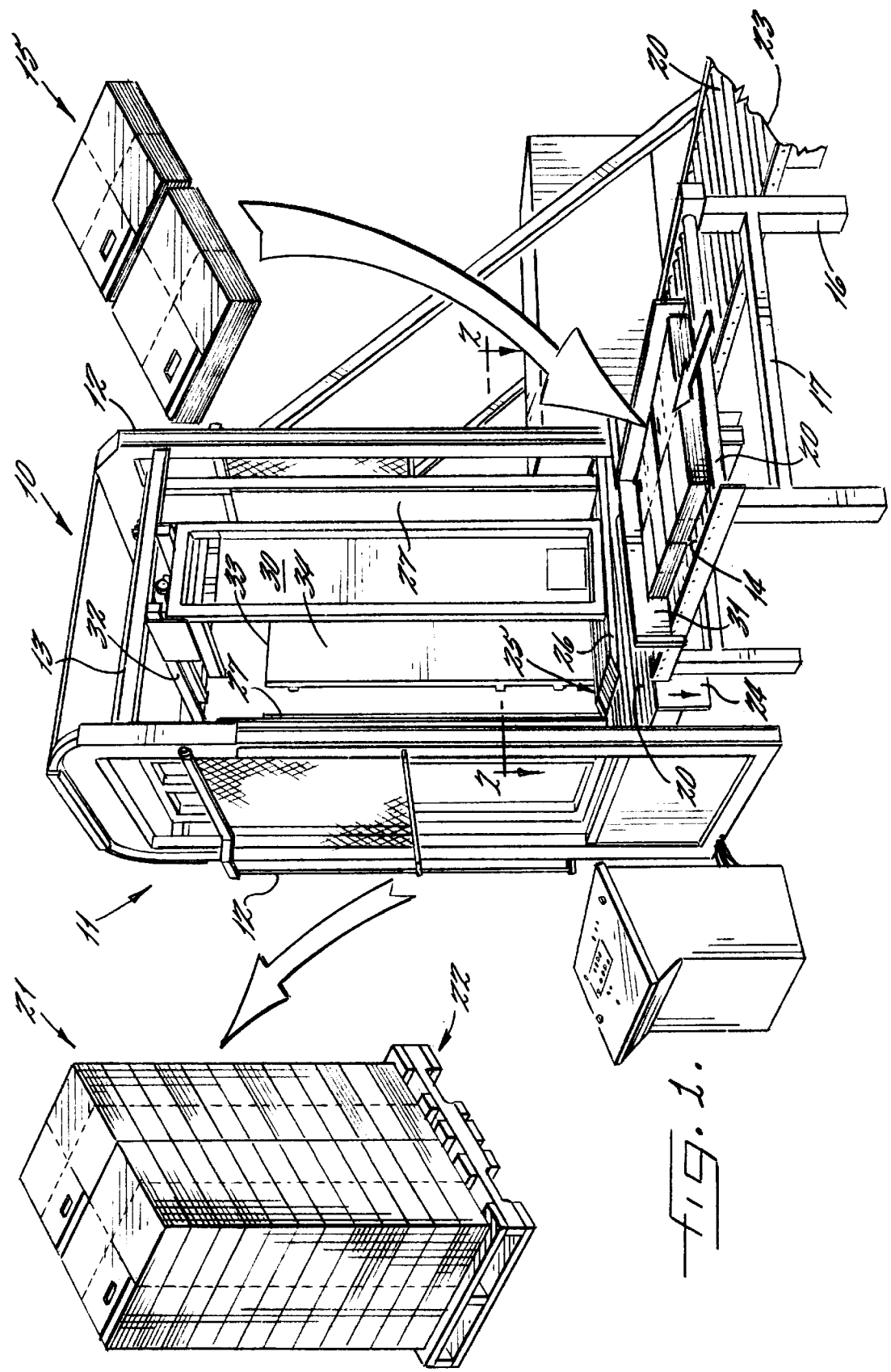
FIG. 1 is a perspective view of the palletizing system showing an advancement means, a stacked load, and a resulting pallet.

The stacking apparatus 10 according to the present invention is illustrated in FIG. 1 and includes a base frame 11 comprised of vertical and horizontal guide rails 12, 13. The stacking apparatus 10 includes a conveyor 14 for receiving and delivering items to be stacked 15. The conveyor 14 is supported by vertical legs 16 secured by horizontal beams 17. The conveyor 10 is formed of a plurality of circular rollers 20 which deliver the items 15 to a stacking position and subsequently discharge a stack of items 21 positioned on a pallet 22. A lower level roller 23 for delivering the pallet 22 to the stacking position is located below and adjacent to the conveyor 14. The positioning of the lower level roller 23 adjacent to the conveyor path is advantageous in that stacked items 21 can be placed directly onto an empty pallet 22 at the stacking position, thus avoiding the additional step of transporting stacked items 21 to a separate area for palletizing.

The stacking apparatus 10 also includes a portion of the conveyor which is liftable 24 between defined raised, and lowered positions. The liftable portion 24 is located within the base frame 11 and is supported by chains and sprockets (not shown) attached to each of the vertical guide rails 12 forming part of the base frame 11. The chain and sprocket lifting means is attached to each corner of the liftable conveyor portion 24 and is driven by a motor (not shown) supported by the horizontal guide rails 13 forming an upper portion of the base frame 11. In its operation, the liftable conveyor portion 24 and an item 15 stacked thereon is raised to a position that exceeds the height of the next succeeding item 15 to be stacked.

Figure 2:
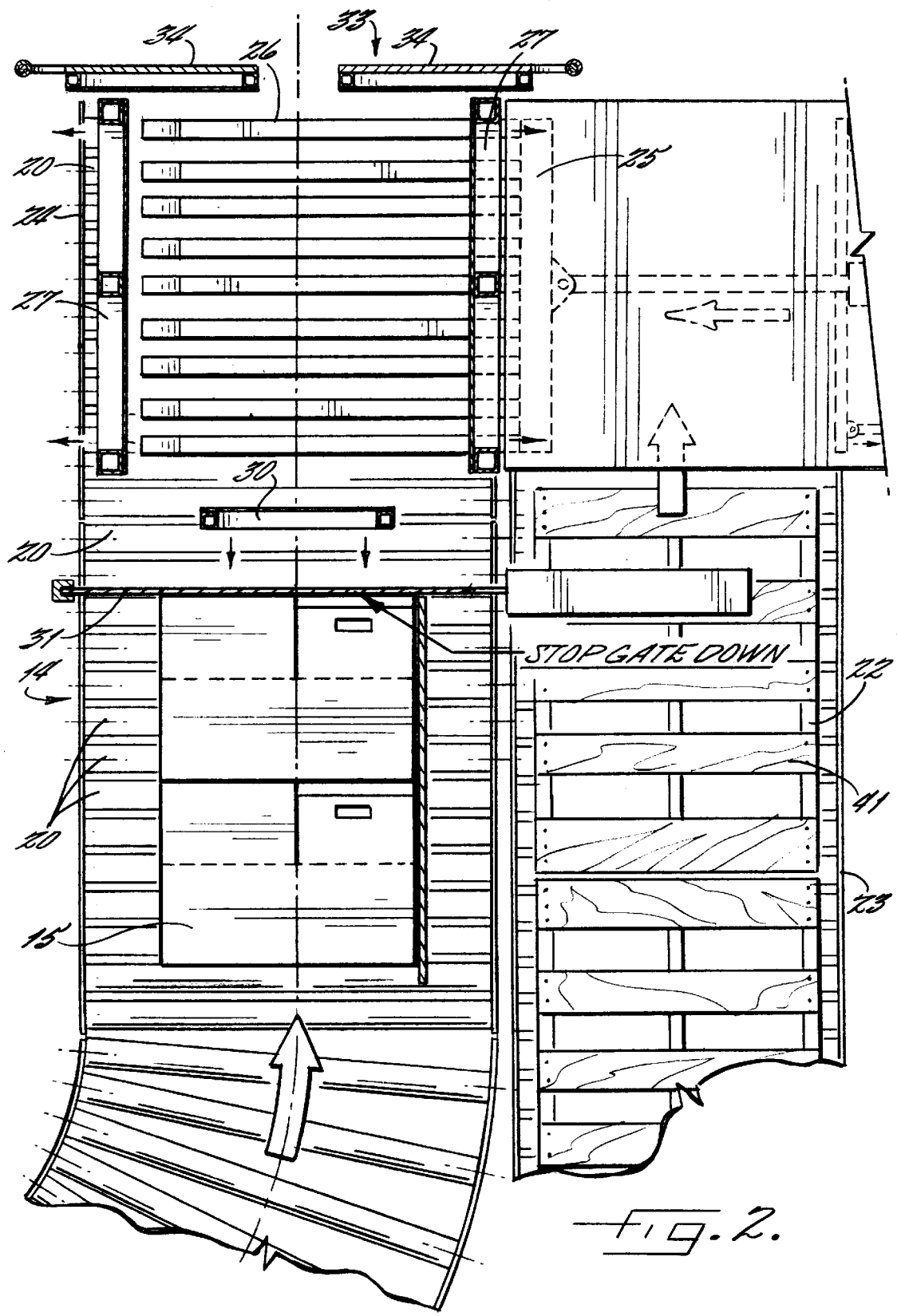
FIG. 2 is an overhead view of the present invention showing a conveyor, lower level conveyor, liftable conveyor portion, platform, and stopgate.
Figure 10:
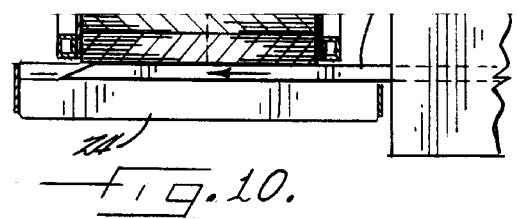
FIG. 10 is a side view showing the side walls reciprocating against the sides of the raised stack and the platform retracting to allow subsequent lifting operations.

The stacking apparatus 10 further includes a securing means comprised of a horizontally reciprocating platform 25 positioned coplanar with the liftable conveyor portion 24 in a lifted position. The platform 25 is formed of a plurality of arms 26 spaced complimentary to the position and spacing of the rollers 20 comprising the liftable conveyor portion 24 in its lifted position. In this configuration, the platform 25 can be reciprocated into and concurrently occupy the same planar position as the liftable conveyor portion 24. As shown in FIGS. 2 and 10, the arms 26 of the platform 25 can be positioned between the rollers 20 comprising the liftable conveyor portion 24. This configuration advantageously allows an item advanced onto the liftable conveyor portion 24 to be supported by the platform 25 in a raised position when the liftable conveyor portion 24 is lowered.

The stacking apparatus 10 shown in FIG. 1 also includes a positioning means comprised of laterally reciprocating side walls 27 and a laterally reciprocating front wall 30 for aligning stacked items in a raised position. The laterally reciprocating side walls 27 and the laterally reciprocating retaining front wall 30 are positioned above the stacking position at a height sufficiently above the liftable conveyor portion 24 to permit a succeeding item to advance along the conveyor 14 and onto the liftable conveyor portion 24 without interference from the side walls 26 or front wall 27. A front stop 31 is positioned perpendicular to the conveyor 14 and can be vertically reciprocated into the conveyor path to halt subsequent advancing items from entering the stacking position.

The reciprocating side walls 26 are mounted along the horizontal guide rails 13 which form an upper portion of the base frame 11 forming the stacking apparatus 10. The retaining front wall 30 is mounted on horizontal guide rails 32 located perpendicular to the horizontal guide rails 13 supporting the reciprocating side walls 27.

As shown in FIG. 2, a rear aligning gate 33 is formed of two hinge mounted gates 34. The hinged mounted gates 34 are mounted on the vertical guide rails 12 forming the base frame 11 of the stacking apparatus 10. The lower level roller 23 positioned adjacent to the conveyor 14 allows the simultaneous delivery of the empty pallet 22 into a position beneath a stack of items supported by the horizontally reciprocating platform 25. An empty pallet 22 is moved onto the liftable conveyor portion 24 in its lowered position by a lower bar 35 which is reciprocated by a piston 34.

Figure 3:
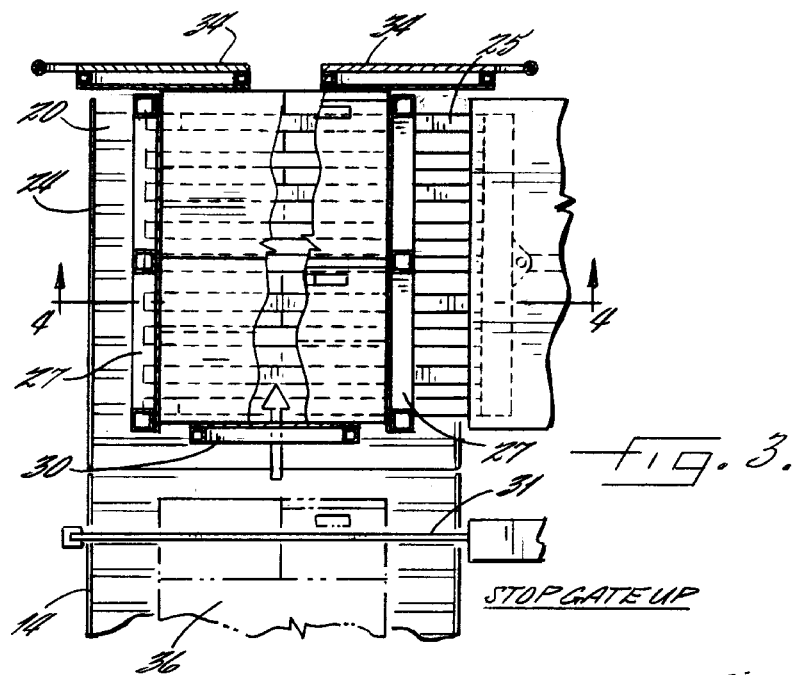
FIG. 3 is an overhead view of the stacking position showing retaining side walls reciprocated against stacked items and the platform engaging thereunder.

As illustrated in FIG. 3, the front stop 31 is raised to allow an advancing item 36 to move onto the liftable conveyor portion without interference from the reciprocating retaining side walls 27 and the reciprocating front wall 30. The rear aligning gate 33 halts the movement of the advancing item and thereby aligns at least one side of the advanced items 36 on the liftable conveyor portion 24. As described earlier, the platform 25 can be reciprocated into and concurrently occupy the same planar position as the liftable conveyor portion 24 wherein the arms 26 of the platform 25 are positioned between the rollers 20 of the liftable conveyor portion 24. The reciprocating platform 25 thereby secures the items 15 in a raised position when the liftable conveyor portion 24 is lowered to allow succeeding items to be introduced into the stacking position.

It will be further understood that the invention comprises the method for forming a plurality of stackable items into a vertically stacked load. FIGS. 4 through 11 illustrate the method for stacking comprised of lifting an item or items 15 which are delivered onto the liftable conveyor portion 24 and positioned beneath the retaining side walls 27 and front wall 30. The platform 25 and item to be stacked 15 are raised to a position coplanar with the reciprocating platform 25. The plurality of arms 26 comprising the platform 25 are then reciprocated underneath the raised item 15 and in between the rollers 20 comprising the liftable conveyor portion 24. The platform 25 thereby secures the raised item 15 as the liftable conveyor portion 24 is lowered to a position coplanar with the conveyor 14 and a succeeding item 37 is advanced along the conveying path once the front stop 31 is raised. The retaining side walls 27 and front wall 30 (not shown) are engaged against at least three sides of the raised secured item 15.

Figure 4:
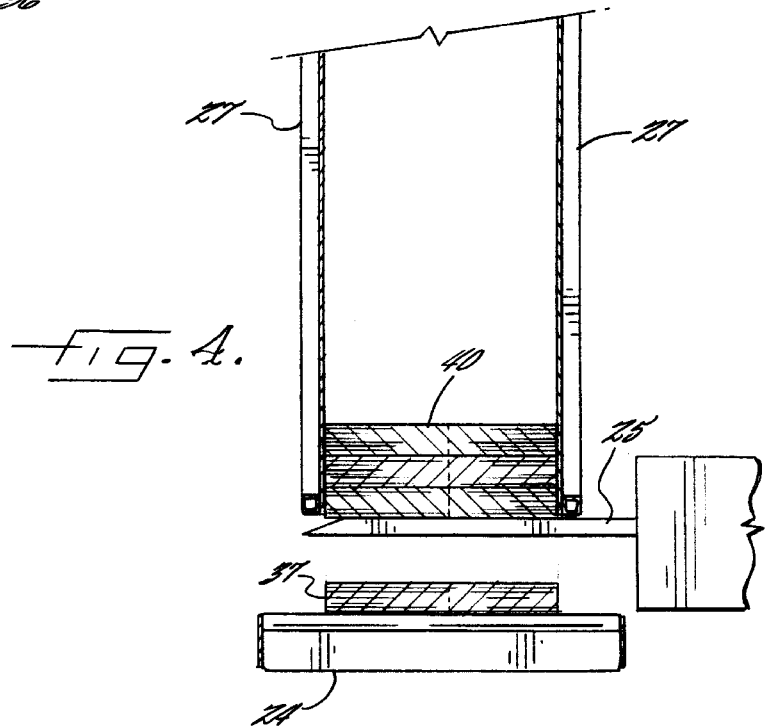
FIG. 4 is a side view of the stacking apparatus showing a liftable portion of the conveyor in its lowered position, retaining side walls reciprocated against a raised load, and platform engaged beneath the stacking position.
Figure 7:
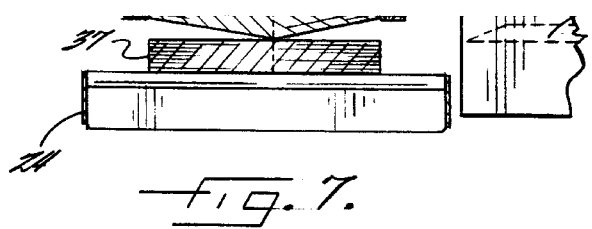
FIGS. 5, 6, and 7 are side views of the stacking method used in the present invention for stacking items.
Figure 5:
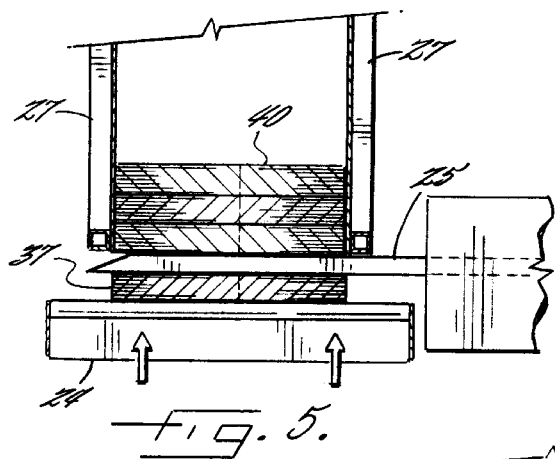
Figure 6:
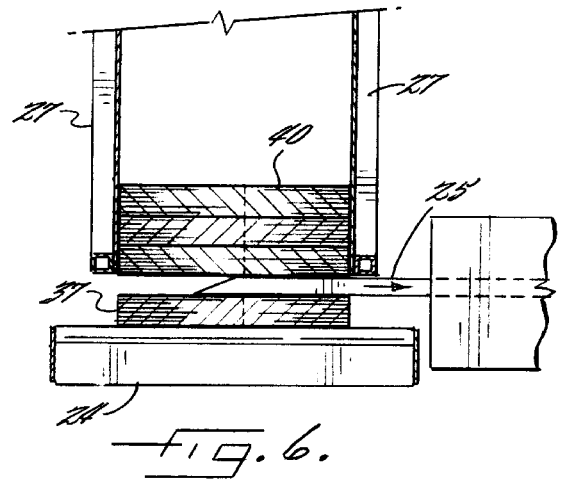
Figure 7:
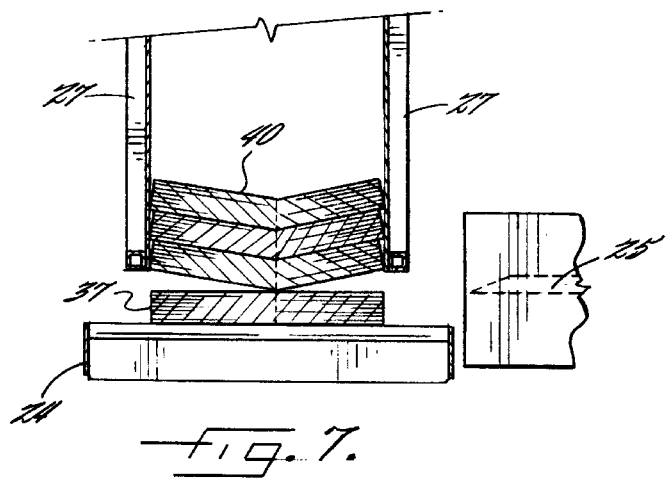

As shown in FIG. 4, the liftable conveyor portion 24 and the succeeding item 37 stacked thereon are positioned below a raised stack of items 40 supported by the platform 25. As shown in FIG. 5, the liftable conveyor portion 24 and the succeeding item 37 stacked thereon are then raised to a position directly beneath the raised item 15. FIG. 6 illustrates the releasing step wherein the platform is retracted and the raised stack 40 partially drops onto the succeeding item 37 located on the liftable conveyor portion 24 (See Fig.7).

Figure 8:
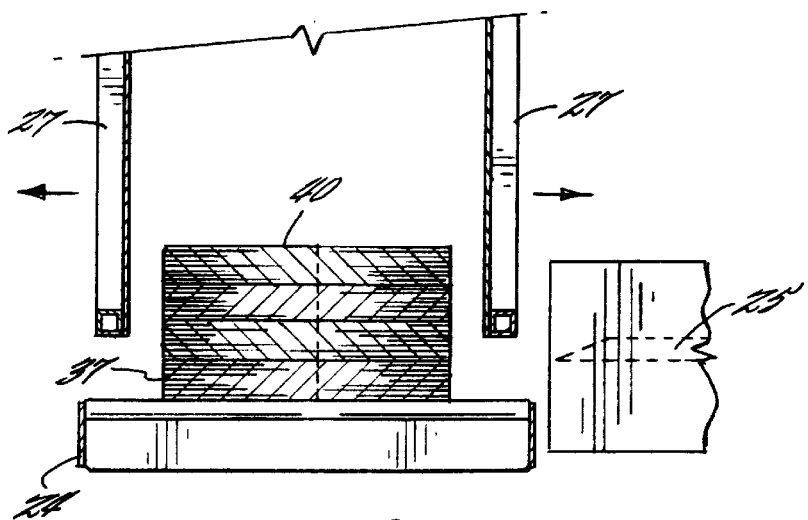
FIG. 8 is a side view of the stacking apparatus with the reciprocating side walls fully retracted and the stacked items resting on the liftable conveyor portion.
Figure 9:
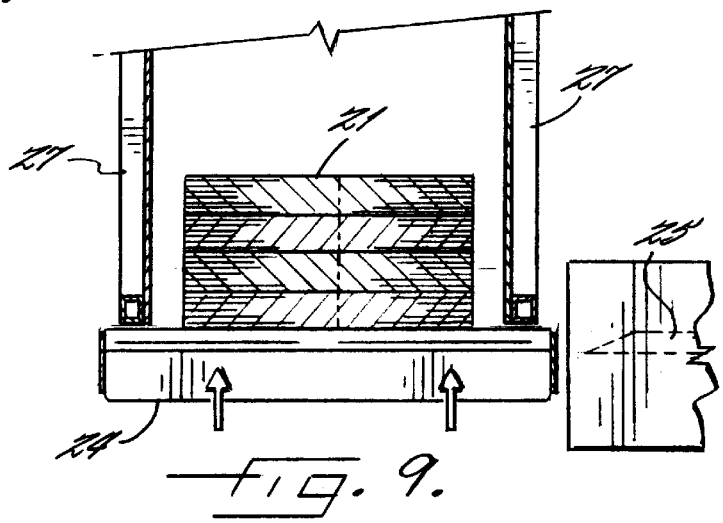
FIG. 9 is a side view of the stacking apparatus showing the liftable conveyor portion being raised to its defined raised position.
Figure 10:
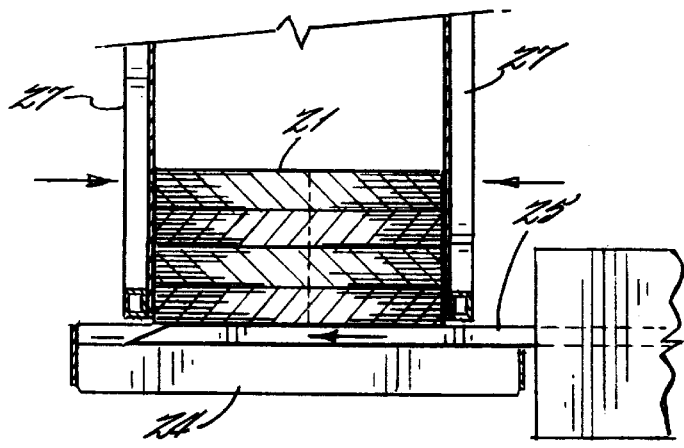
Figure 11:
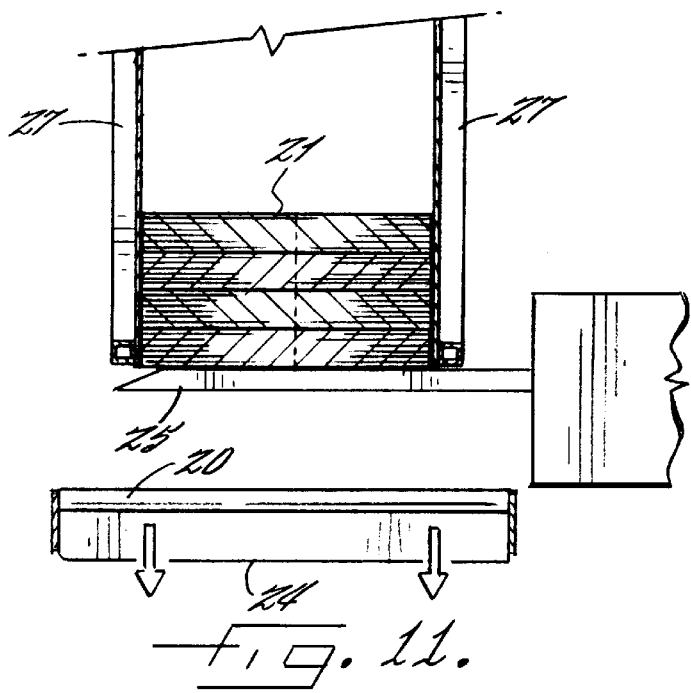
FIG. 11 is a side view showing the stacked items secured by the reciprocating side walls and the platform while the liftable conveyor portion lowers to its defined lower position to allow for the subsequent advancement of a succeeding item.

FIG. 8 illustrates the retaining side walls 27 and front wall 30 disengaging thereby causing the raised stack 40 to rest upon the succeeding item 37 positioned on the liftable conveyor portion 24. The lifting of the stacked items 21 is illustrated in FIG. 9 wherein the liftable conveyor portion 24 is raised so that the stacked items 21 are positioned within the retaining side walls 27 and front wall 30. As illustrated in FIG. 10, the reciprocating platform 25 is moved into a position beneath the stacked items 21 and the side walls 27 and front wall 30 are engaged against at least three sides of the stacked items 21. To its advantage, the positioning means comprising the retaining side walls 27 and front wall 30 align the stacked items into a rectangle when the side walls 27 and front wall 30 are engaged thereby aligning the stacked items 21 against the rear aligning gate 33. Finally, FIG. 11 depicts the aligned and stacked items 21 secured in a lifted position by the platform 25 while the liftable conveyor portion 24 is lowered and positioned adjacent to the roller conveyor 14 for receiving the next succeeding item 37. The steps are repeated until the items reach a predetermined stacking height.

Figure 12:
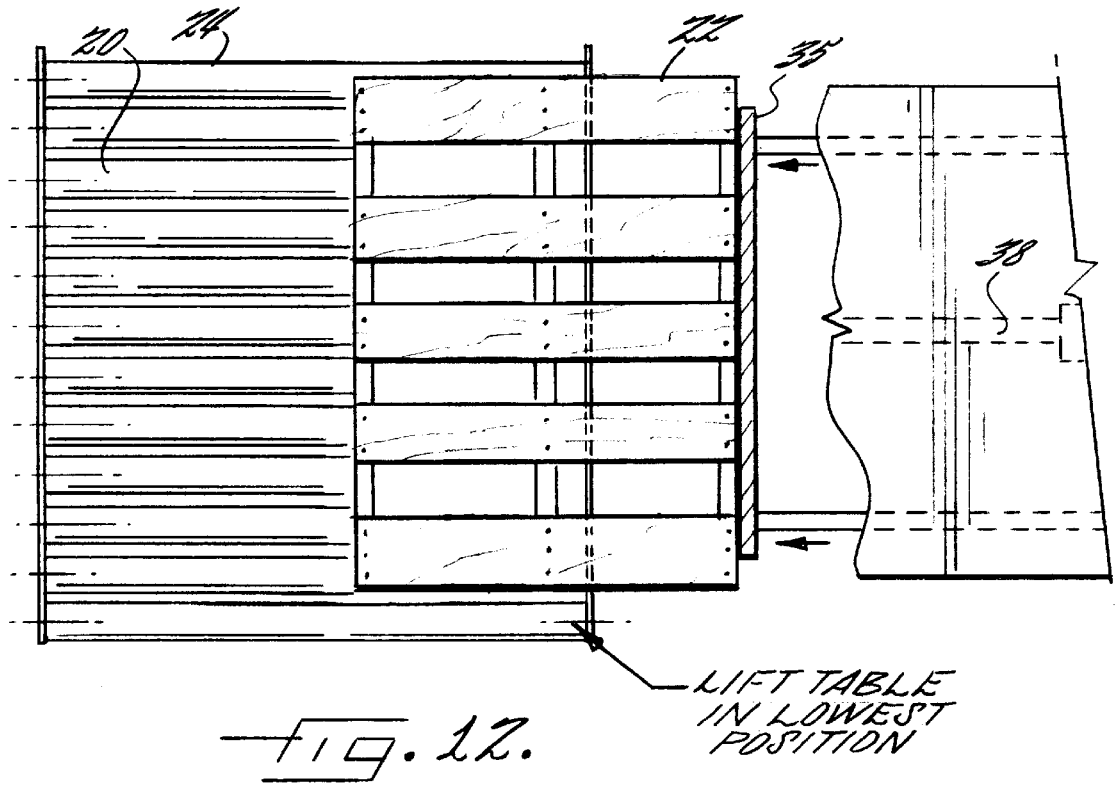
FIG. 12 is an overhead view of an underlying pallet for receiving stacked items moving onto the liftable conveyor portion at its lowest position.
Figure 13:
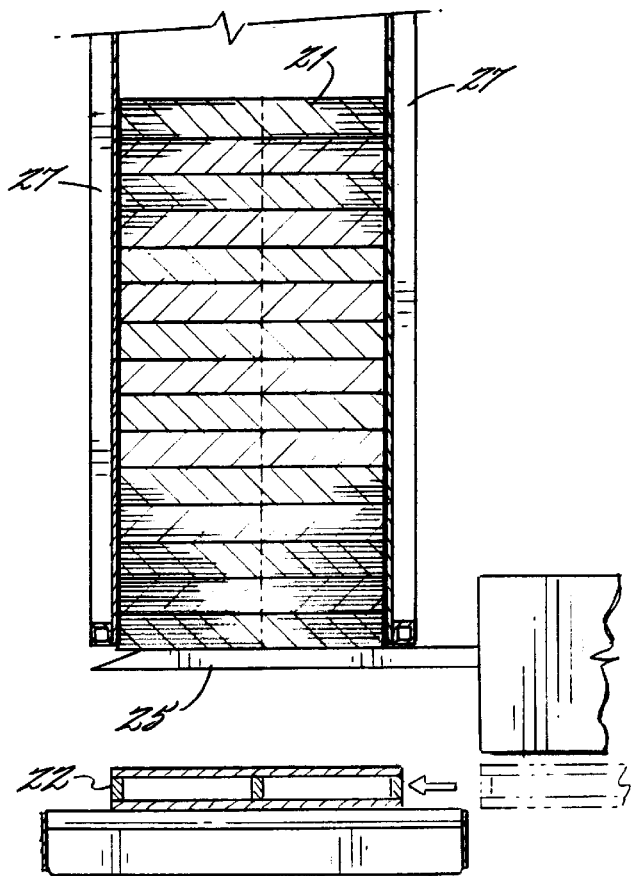
FIG. 13 is a side view of the stacking apparatus showing stacked items secured by the reciprocating side walls and platform.

Upon reaching the desired stacking height, the liftable conveyor portion 24 is lowered to a position adjacent to the lower level roller 23 containing an empty stacking pallet 22. As shown in FIG. 12, an empty pallet 22 is moved onto the conveyor platform 24 by the lower level bar 35. The horizontally reciprocating transverse bar 35 is attached to a piston 38 for reciprocating the bar 35. Once the empty pallet 22 is moved onto the liftable conveyor portion 24, the liftable conveyor portion 24 and the empty pallet 22 positioned thereon are raised to a position directly beneath the raised stacked items 21 as shown in FIG. 13. The spacing of the slats 41 comprising the pallet 22 allow the plurality of arms 26 comprising the platform 25 to be positioned and spaced complimentary to the position and spacing of the slats 41 so that the platform 25 can concurrently occupy the same planar position as the empty pallet 22. In this configuration, the arms 26 of the platform 25 are positioned between the slats of the pallet 22.

Figure 14:
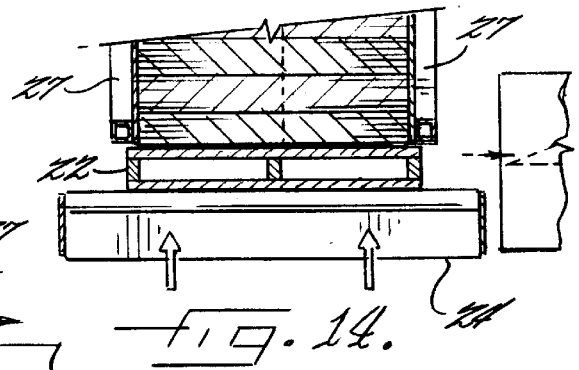
FIG. 14 is a side view of the stacking apparatus showing the liftable conveyor portion raising the pallet to a position directly beneath the raised secured stack and the platform being retracted.
Figure 15:
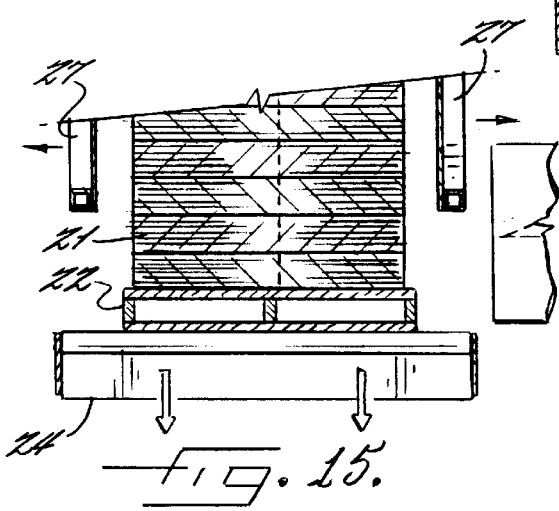
FIG. 15 is a side view showing the liftable conveyor portion with the palletized stack being lowered to its lowest position for subsequent discharge from the stacking apparatus.
Figure 16:
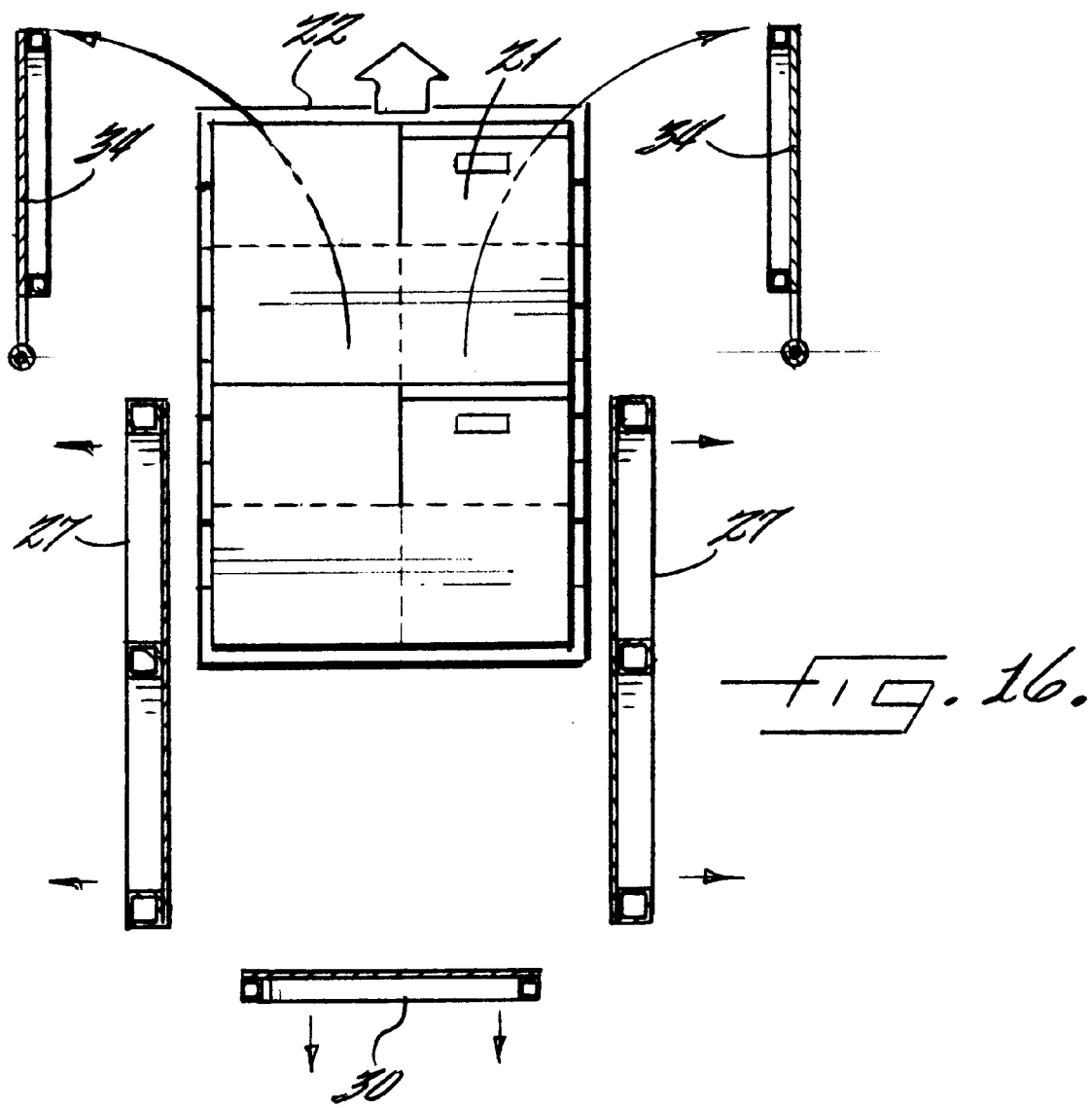
FIG. 16 is an overhead view of the back wall opening and the resulting palletized stack being discharged from the stacking apparatus.

FIG. 14 shows the platform 25 retracted once the stack 15 is supported by the pallet 22. As shown in FIG. 15, the side walls 27 and front wall 30 are released and the liftable conveyor portion 24 and the stack 15 thereon are lowered to the lower level roller 23. FIG. 16 shows the retaining side walls 27 and the front wall 30 disengaging, the hinge mounted gates 34 opening outwardly and the palletized stack of items 21 being discharged for eventual ground transportation.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. An apparatus for stacking succeeding delivered items and thereafter delivering an aligned stack of the items, said apparatus comprising:

a roller conveyor formed of a plurality of parallel rollers with spaces therebetween;

a lower level roller located below and adjacent said roller conveyor;

means for vertically moving portions of said roller conveyor among respective positions coplanar with said roller conveyor, a lowered position coplanar with said lower roller and a lifted position above the plane of said roller conveyor;

a horizontally reciprocating platform coplanar with said lifted position of said roller conveyor portion, said platform being formed of a plurality of arms positioned and spaced complementary to the position and spacing of said rollers of said conveyor portion so that said platform can be reciprocated into and concurrently occupy the same planar position as said conveyor portion with said arms of said platform positioned between said rollers of said conveyor and regardless of the presence of an item or items on said conveyor portion and so that an item lifted by said conveyor portion will remain supported by said platform in a lifted position after said conveyor portion is lowered.

2. A stacking apparatus according to claim 1 and further comprising means for positioning advancing items on said moveable conveyor portions.

3. A stacking apparatus according to claim 2 wherein said positioning means comprises two opposing and laterally reciprocating side walls positioned above said moveable conveyor portions for reciprocating against and thereby aligning two opposing sides of each stacked item in a stack on said moveable conveyor portions.

4. A stacking apparatus according to claim 3 wherein said positioning means further comprises a laterally reciprocating retaining front wall positioned above said movable conveyor portions and perpendicular to said two side walls for being reciprocated against a side of a stacked item and a stack other than the sides against said side walls are reciprocated.

5. A stacking apparatus according to claim 4 wherein said side walls and said front wall are positioned at a height sufficently above the lowered position of said moveable conveyor portion to permit a next succeeding item to reach said moveable conveyor portions without interference from said side walls or said front wall.

6. A stacking apparatus according to claim 1 comprising means for preventing succeeding items on said conveyor from unintentionally reaching said moveable conveyor portions.

7. A stacking apparatus according to claim 6 wherein said preventing means comprises a vertically reciprocating front stop positioned perpendicular to said conveyor so that said front stop can be reciprocated into said conveyor path to halt said advancing items.

8. A stacking apparatus according to claim 1 and further comprising a rear aligning gate parallel to and spaced opposite from said reciprocating front wall for aligning said stacked items into a "square" or rectangle when said side walls and front wall are reciprocated against at least three sides of said stacked items.

9. A stacking apparatus according to claim 8 and further comprising a base frame formed of a plurality of vertical columns wherein said rear aligning gate comprises hinge mounted gates secured to said vertical columns for opening said gate and allowing a stack of items to pass therethrough.

10. A stacking apparatus according to claim 1 wherein said vertically moving means comprises multiple endless chains and sprockets located in each said vertical columns forming a portion of said base frame, said chains attached to each corner of said moveable conveyor portion.

11. A stacking apparatus according to claim 10 wherein said vertically moving means is driven by a motor located on a top portion of said base frame.

12. A stacking apparatus according to claim 1 wherein said lower level roller includes a lower level bar located adjacent to said lower level roller for advancing empty pallets to said moveable conveyor portion.

13. A stacking apparatus according to claim 12 wherein said bar is reciprocated by a piston.

14. A stacking apparatus according to claim 1 and further comprising means for advancing items along a conveying path to said vertically movable conveyor portions.

15. A stacking apparatus according to claim 1 wherein said reciprocating platform further comprises a cylinder and piston for horizontally reciprocating said platform.

16. A method for stacking a plurality of stackable items into a vertically stacked load, the method comprising:

(a) lifting a first item from a first planar position to a second lifted position above the first planar position;

(b) temporarily securing the first item in the second lifted position;

(c) moving a succeeding item into the first planar postion and aligned beneath the lifted and secured first item;

(d) lifting the succeeding item to a position immediately beneath the first secured item;

(e) releasing the first item to drop onto the lifted succeeding item;

(f) thereafter lifting both together until the succeeding item is at the second lifted position;

(g) lifting a last item from a third planar position below the first planar position to a position immediately beneath the previously lifted items; and (h) releasing the first and succeeding items onto the last item.

17. A stacking method according to claim 16 wherein step (f) further comprises temporarily securing the first and succeeding items in the second lifted position.

18. A stacking method according to claim 17 wherein the steps of temporarily securing further comprises engaging said support means beneath the lifted items in the second lifted position.

19. A stacking method according to claim 18 further comprises lowering the moveable conveyor portion to the third planar position adjacent to the lower level roller for delivering the pallet.

20. A stacking method according to claim 19 further comprises moving the pallet along the lower level roller and onto the moveable conveyor portion.

21. A stacking method according to claim 16 wherein steps (b) and (f) further comprise the step of positioning the lifted item or items on the moveable conveyor portion.

22. A stacking method according to claim 21 wherein said positioning step further comprises laterally reciprocating a retaining front wall positioned above the moveable conveyor portion and perpendicular to the side walls against a side of the stacked items and a stack other than the sides against the side walls are reciprocated.

23. A stacking method according to claim 22 wherein the side walls and front wall reciprocate against at least three sides of the stacked items thereby moving the stack against a rear aligning gate and aligning the stacked items into a rectangular shape.

24. A stacking method according to claim 21 wherein said positioning step comprises laterally reciprocating two side walls positioned above the moveable conveyor portion against the stacked items and thereby aligning at least two opposing sides of each stacked item.

25. A stacking method according to claim 21 wherein the positioning step further comprises aligning the stacked items above the moveable conveyor portion and any succeeding item stacked thereon.

26. A stacking method according to claim 16 further comprises advancing the stackable items along a conveyor path by means of a feed conveyor to the first planar position.

27. A stacking method according to claim 16 wherein step (a) further comprises raising a vertically moveable conveyor portion and the first item positioned thereon to the second lifted position.

28. A stacking method according to claim 16 wherein step (b) further comprises engaging support means beneath the lifted item to secure the item in its lifted position.

29. A stacking method according to claim 16 wherein step (c) further comprises advancing the succeeding item along the conveyor path to the first planar position beneath the secured lifted item.

30. A stacking method according to claim 16 wherein step (d) further comprises raising the moveable conveyor portion and succeeding item thereon to a position immediately beneath the first secured lifted item.

31. A stacking method according to claim 16 wherein step (e) further comprises disengaging support means beneath the lifted item to release the item from its lifted position.

32. A stacking method according to claim 16 wherein step (f) comprises raising the moveable conveyor portion and items positioned thereon to the second lifted position.

33. A stacking method according to claim 16 further comprises repeating steps (a)–(f) for a plurality of succeeding items before carrying out step (g) for the last item.

34. A stacking method according to claim 33 wherein step (g) comprises lifting a pallet from the third planar position as the last item so that the first and succeeding items are stacked onto the pallet.

35. A stacking method according to claim 16 wherein step (h) comprises lowering the pallet and the stacked items thereon to the third planar position and discharging the palletized stack therefrom.

* * * * *